No. 853,770. PATENTED MAY 14, 1907.
A. CHRONIK.
WEIGHING SCALE.
APPLICATION FILED OCT. 18, 1906.
2 SHEETS—SHEET 1.
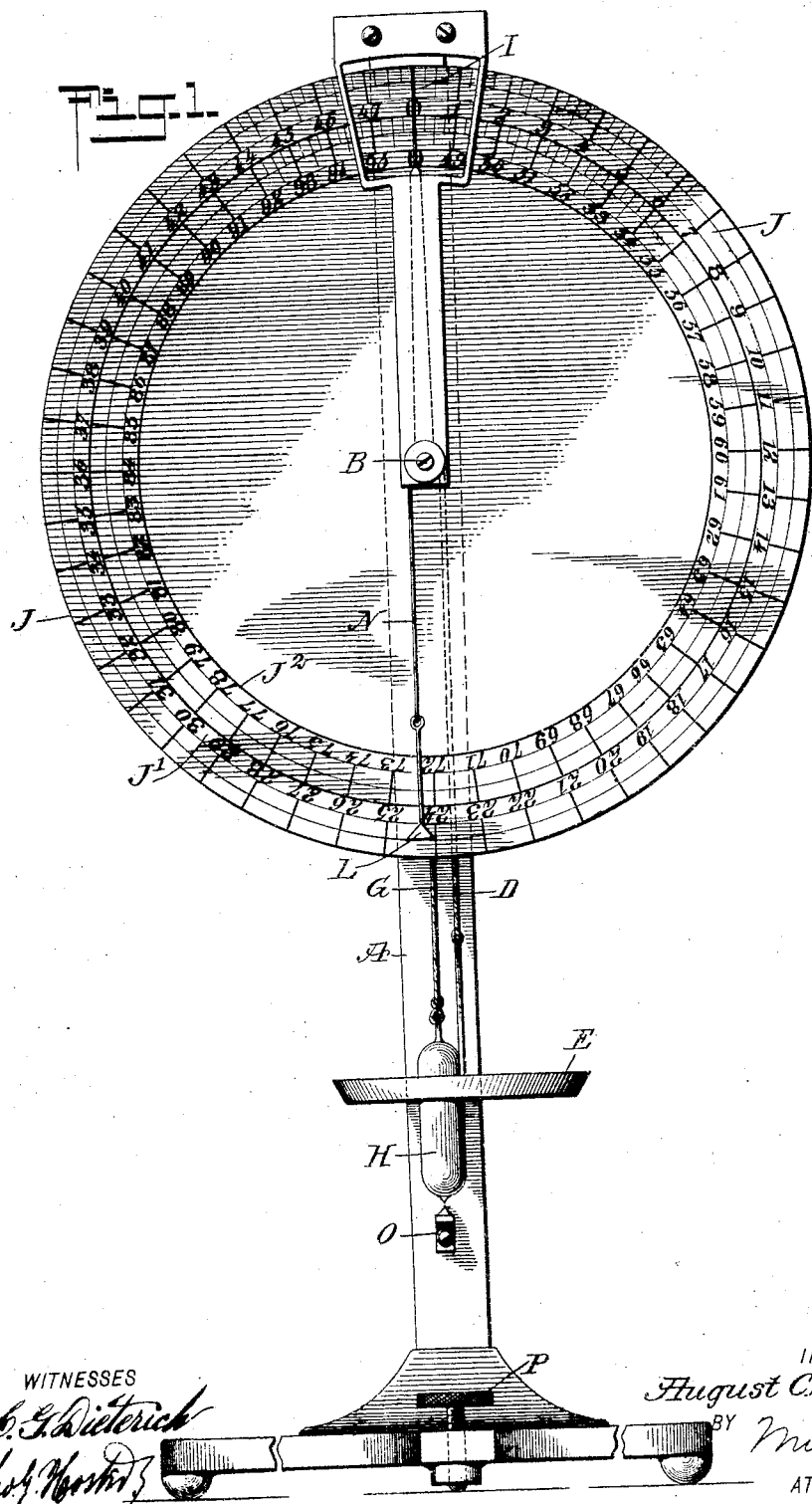

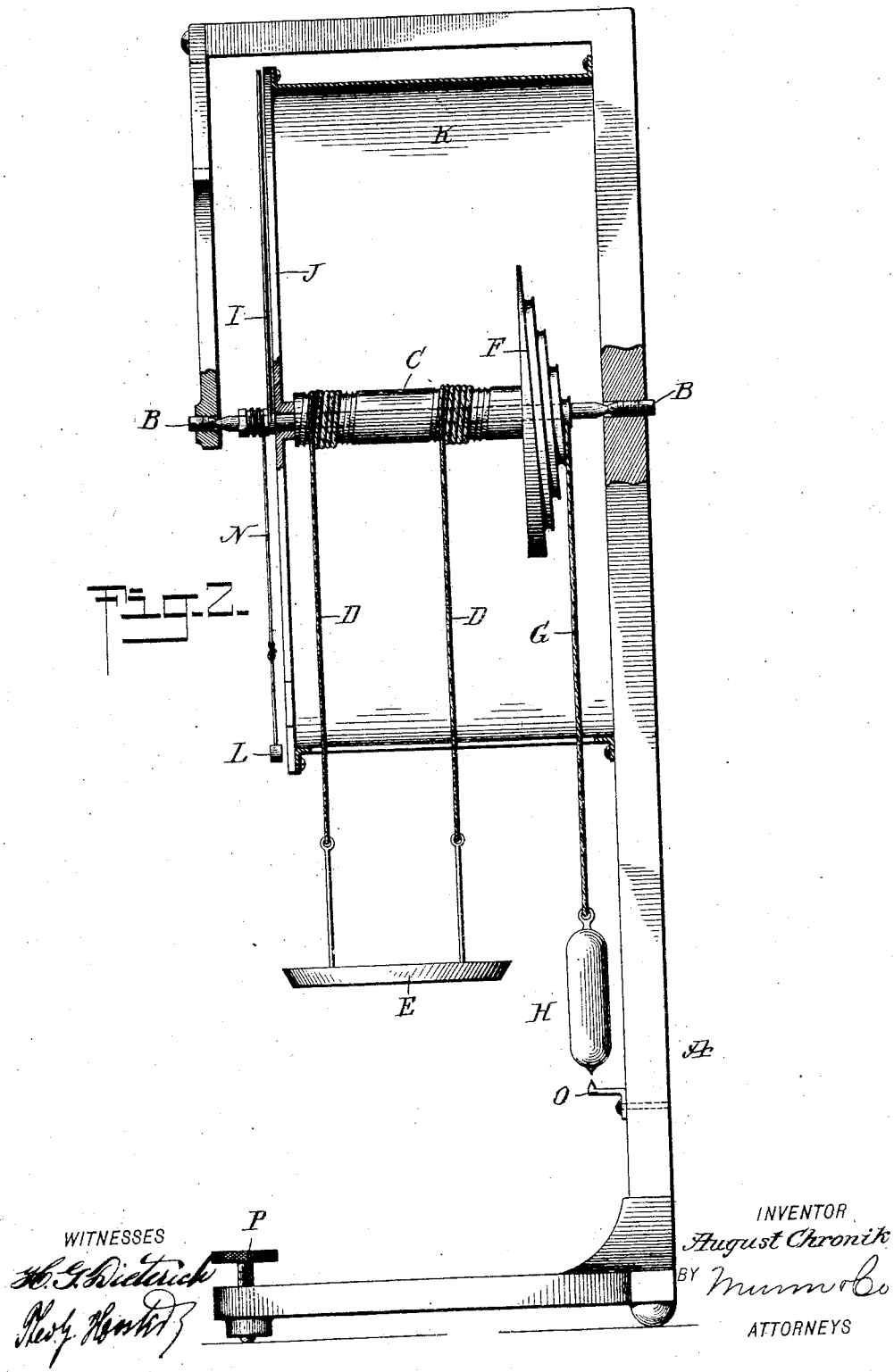

UNITED STATES PATENT OFFICE.

AUGUST CHRONIK, OF NEW YORK, N. Y.

WEIGHING-SCALE.

No. 853,770.      Specification of Letters Patent.      Patented May 14, 1907.

Application filed October 18, 1906. Serial No. 339,486.

*To all whom it may concern:*

Be it known that I, AUGUST CHRONIK, a citizen of the United States, and a resident of the city of New York, borough of Manhattan, in the county and State of New York, have invented a new and Improved Weighing-Scale, of which the following is a full, clear, and exact description.

The invention relates to measuring instruments, and its object is to provide a new and improved weighing scale, more especially designed for accurately and quickly weighing small quantities.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both the views.

Figure 1 is a front elevation of the improvement, and Fig. 2 is a transverse section of the same.

A suitably constructed stand or frame A is provided with centers B, B, on which is hung a drum C for winding up and unwinding cords or ropes D supporting a pan E or other device for holding the object to be weighed. On the drum C is secured a spiral pulley F having a plurality of grooved convolutions on which winds and unwinds a rope or cable G carrying at its lower end a weight H. On the outer end of the drum C is secured a pointer I, indicating on a dial J arranged on the front of a casing K attached to the stand A and inclosing the major portion of the drum C and spiral pulley F. The dial J is provided with a plurality of annular graduations J', J², the divisions of which indicate a unit weight and sub-divisions thereof, as plainly shown in Fig. 1. Now when a substance is placed in the pan E, the latter descends and in doing so rotates the drum C, thus winding up the weighted rope G on the spiral pulley F, at the same time turning the pointer I around, and if the object placed in the pan E is sufficiently heavy the pointer I may make more than one revolution, and in order to indicate now on which of the graduations J', J² to read the weight of the object in the pan E, the following device is provided. An indicator L, preferably in the form of a triangular block, is suspended on a cord N winding up and unwinding on the forward end of the drum C but in a reverse direction to the ropes or cables D, so that when the pan E descends the indicator L rises, thus indicating on which of the graduations J' or J² the weight of the substance is to be read. Normally the indicator L is at the outermost graduation J', but when the pointer has made more than one revolution the indicator L rises to the next graduation J², and if more such graduations are on the dial J it is evident that the indicator L rises correspondingly on the further descent of the pan E and the heavier object contained therein. When the pan E with the object therein descends the weight H is drawn up correspondingly, and by the use of the spiral pulley F the increase in the weight of the pan E by the lengthening of the ropes or cables D is compensated for by the increase in the leverage of the cable G on the spiral pulley F, so that an exceedingly accurate weighing is had.

When the several parts are in the zero position indicated in the drawings, then the lower pointed end of the weight H is opposite the pointed end of an arm O attached to the stand A, the said pointed ends also indicating whether the stand is level or not. In order to enable the operator to properly level the stand, the base thereof is preferably triangular, and the forward arm is provided with a set screw P engaging the surface on which the stand is mounted, so that the operator on turning the screw P can readily level the stand, the level being indicated by the opposing points of the weight H and the arm O.

The weighing scale shown and described is very simple and durable in construction, and permits the accurate weighing of exceedingly small quantities.

Having thus described my invention, I claim as new and desire to secure by Letters Patent:

1. A weighing scale comprising a drum, a flexible pan suspension adapted to wind up and unwind on the said drum, a spiral pulley turning with the said drum, a rope carrying a weight and winding up and unwinding on the said spiral pulley, a pointer turning with the said drum, a dial on which indicates the said pointer and means for indicating the number of turns made by the said pointer.

2. A weighing scale comprising a drum, a flexible pan suspension adapted to wind up and unwind on the said drum, a spiral pulley turning with the said drum, a rope carrying a weight and winding up and unwinding on the said spiral pulley, a pointer turning with the said drum, a dial on which indicates the said pointer, and means for indicating the number of turns made by the said pointer.

3. A weighing scale comprising a drum, a flexible pan suspension adapted to wind up and unwind on the said drum, a spiral pulley turning with the said drum, a rope carrying a weight and winding up and unwinding on the said spiral pulley, a pointer turning with the said drum, a dial on which indicates the said pointer, the said dial having a plurality of annular graduations, an auxiliary pointer indicating on the said annular graduations, and a rope carrying the said auxiliary pointer and winding and unwinding on the said drum.

4. A weighing scale comprising a stand provided with centers, a drum hung on the said centers, a weighing pan and a flexible suspension for the same and winding up and unwinding on the said drum, a spiral pulley attached to the said drum, a rope winding up and unwinding on the said drum, a weight carried by the said rope, a pointer attached to the said drum, and a dial on which indicates the said pointer and means for indicating the number of turns made by the said pointer.

5. A weighing scale comprising a stand provided with centers, a drum hung on the said centers, a weighing pan, and a flexible suspension for the same and winding up and unwinding on the said drum, a spiral pulley attached to the said drum, a rope winding up and unwinding on the said pulley, a weight carried by the said rope, a pointer attached to the said drum, a dial on which indicates the said pointer, the said dial having a plurality of annular graduations, a rope winding up and unwinding on the said drum and an indicator on the rope, the indicator indicating on the said graduations.

6. A weighing scale comprising a stand provided with centers, a drum hung on the said centers, a weighing pan and a flexible suspension for the same and winding up and unwinding on the said drum, a spiral pulley attached to the said drum, a rope winding up and unwinding on the said pulley, a weight carried by the said rope, a pointer attached to the said drum, a dial on which indicates the said pointer, means for leveling the said stand, and an arm on the frame operating in conjunction with the said weight to indicate the level position of the scale.

In testimony whereof I have signed my name to this specification in the presence of two subscribing witnesses.

AUGUST CHRONIK.

Witnesses:
 THEO. G. HOSTER,
 EVERARD B. MARSHALL.